United States Patent
Shaaban et al.

(10) Patent No.: US 11,693,911 B2
(45) Date of Patent: Jul. 4, 2023

(54) SYSTEM AND METHOD FOR MANAGING RELATIONSHIPS BY IDENTIFYING RELEVANT CONTENT AND GENERATING CORRESPONDENCE BASED THEREON

(71) Applicant: Fulcrum Global Technologies Inc., Chicago, IL (US)

(72) Inventors: Ahmed Farouk Shaaban, South Barrington, IL (US); Venkat Thandra, South Barrington, IL (US)

(73) Assignee: FULCRUM GLOBAL TECHNOLOGIES, Chicago, IL (US)

(*) Notice: Subject to any disclaimer, the term of this patent is extended or adjusted under 35 U.S.C. 154(b) by 428 days.

(21) Appl. No.: 16/983,173

(22) Filed: Aug. 3, 2020

(65) Prior Publication Data
US 2021/0042378 A1    Feb. 11, 2021

Related U.S. Application Data

(60) Provisional application No. 62/884,654, filed on Aug. 8, 2019.

(51) Int. Cl.
| | |
|---|---|
| *G06F 16/28* | (2019.01) |
| *G06F 16/9535* | (2019.01) |
| *G06Q 30/01* | (2023.01) |
| *G06F 16/2457* | (2019.01) |

(52) U.S. Cl.
CPC .... *G06F 16/9535* (2019.01); *G06F 16/24578* (2019.01); *G06F 16/288* (2019.01); *G06Q 30/01* (2013.01)

(58) Field of Classification Search
CPC ............. G06F 16/9535; G06F 16/9536; G06F 16/9538; G06F 16/24578; G06F 16/288; G06Q 30/01
See application file for complete search history.

(56) References Cited

U.S. PATENT DOCUMENTS

| | | | |
|---|---|---|---|
| 2010/0042612 A1* | 2/2010 | Gomaa ................. | G06F 16/335 709/224 |
| 2011/0145023 A1* | 6/2011 | Stahl ..................... | G06Q 30/02 705/4 |
| 2020/0153765 A1* | 5/2020 | Burbank ............... | H04L 51/046 |
| 2021/0097628 A1* | 4/2021 | Koi ....................... | G06F 16/288 |

* cited by examiner

*Primary Examiner* — Kris E Mackes
(74) *Attorney, Agent, or Firm* — Global IP Counselors, LLP

(57) ABSTRACT

Systems and methods for managing contacts and generating communications with relevant content are disclosed herein. In an embodiment, a system for generating correspondence with one or more contact includes a central server with at least a processor and a memory. The central server is configured to communicate with a user terminal and a plurality of content sources. The processor is configured to execute instructions stored on the memory to cause the central server to: (i) determine at least one keyword relevant to at least one contact based on at least one contact input entered using the user terminal; (ii) use the at least one keyword to identify relevant content from the plurality of content sources; (iii) calculate at least one value for the relevant content; and (iv) generate a suggested communication to be displayed for the user on the user terminal when the at least one value meets a threshold.

20 Claims, 5 Drawing Sheets

SYSTEM AND METHOD FOR MANAGING RELATIONSHIPS BY IDENTIFYING RELEVANT CONTENT AND GENERATING CORRESPONDENCE BASED THEREON

PRIORITY

This patent application claims priority to U.S. Provisional Patent Application No. 62/884,654, filed Aug. 8, 2019, entitled "Relationship Management Tool Incorporating Contact Recommendation," the entirety of which is incorporated herein by reference and relied upon.

BACKGROUND

Technical Field

This disclosure generally relates to a system and method for managing contact relationships. More specifically, the present disclosure relates to a system and method for identifying optimal content for a contact and automatically generating correspondence based thereon.

Background Information

Various relationship management tools, such as customer relationship management (CRM) tools, typically permit a first party to a relationship to store and manipulate basic information about a second party to the relationship (e.g., business organizations and/or individual people), thereby permitting the first party to improve the relationships with the second party, often in the form of improved customer experiences, customer retention, etc. Examples of such existing CRM tools include Salesforce, HubSpot, and Pipedrive. While such CRM tools offer significant features, they are often most adept at capturing and analyzing past interactions between parties rather than providing capabilities for proactively providing opportunities to strengthen relationships. More particularly, such CRM tools fail to provide the ability to identify content of potential interest to the parties of a given relationship, nor the ability to readily communicate such content.

SUMMARY

It has been discovered that tools for optimizing professional services resources are desired. A first aspect of the present disclosure is to provide a system for generating correspondence with one or more contact. The system can include a central server including at least a processor and a memory. The central server is configured to communicate with a user terminal and a plurality of content sources. The user terminal is configured to accept, from a user, at least one contact input regarding at least one contact. The plurality of content sources are controlled by a plurality of third parties and include potential content of interest to the contact. The processor is configured to execute instructions stored on the memory to cause the central server to: (i) determine at least one keyword relevant to the at least one contact based on the at least one contact input; (ii) use the at least one keyword to identify relevant content from the plurality of content sources; (iii) calculate at least one value for the relevant content; and (iv) generate a suggested communication to be displayed for the user on the user terminal when the at least one value meets a threshold.

In accordance with a second aspect of the present disclosure, which can be combined with the first aspect, the at least one contact input relates to the at least one contact's professional or personal information.

In accordance with a third aspect of the present disclosure, which can be combined with any one or more of the previous aspects, determining the at least one keyword includes generation of a keyword algorithm using the at least one keyword, and identifying the relevant content includes applying the keyword algorithm to the plurality of content sources.

In accordance with a fourth aspect of the present disclosure, which can be combined with any one or more of the previous aspects, calculating the at least one value includes performing a calculation using an input based on a time since last working engagement with the at least one contact.

In accordance with a fifth aspect of the present disclosure, which can be combined with any one or more of the previous aspects, the time since last working engagement is a variable which varies linearly with time until reaching a maximum value.

In accordance with a sixth aspect of the present disclosure, which can be combined with any one or more of the previous aspects, calculating the at least one value includes performing a calculation using an input based on an age of relationship between the user and the at least one contact.

In accordance with a seventh aspect of the present disclosure, which can be combined with any one or more of the previous aspects, the age of the relationship is a variable which varies sinusoidally over time once a minimum threshold has been reached.

In accordance with an eighth aspect of the present disclosure, which can be combined with any one or more of the previous aspects, the user terminal includes a digital calendar, and calculating the at least one value includes performing a calculation using an input based an amount of time since a communication between the user and the at least one contact as determined from the digital calendar.

In accordance with a ninth aspect of the present disclosure, which can be combined with any one or more of the previous aspects, calculating the at least one value includes summing a plurality of variables based on a relationship between the user and the at least one contact.

In accordance with a tenth aspect of the present disclosure, which can be combined with any one or more of the previous aspects, calculating the at least one value includes multiplication of a value based on weighted keywords.

In accordance with an eleventh aspect of the present disclosure, which can be combined with any one or more of the previous aspects, a method of generating correspondence with one or more contact is provided. The method includes determining at least one keyword relevant to at least one contact based on at least one interest of the at least one contact, identifying relevant content from a plurality of content sources based on the at least one keyword, calculating at least one value for the relevant content, and generating a suggested communication to be transmitted to the at least one contact when the at least one value meets a threshold.

In accordance with a twelfth aspect of the present disclosure, which can be combined with any one or more of the previous aspects, determining the at least one keyword includes generating a keyword algorithm using the at least one keyword, and identifying the relevant content includes applying the keyword algorithm to the plurality of content sources.

In accordance with a thirteenth aspect of the present disclosure, which can be combined with any one or more of the previous aspects, calculating the at least one value includes using an input based on a time since last working engagement with the at least one contact, and the time since last working engagement is calculated using a variable which varies linearly with time until reaching a maximum value.

In accordance with a fourteenth aspect of the present disclosure, which can be combined with any one or more of the previous aspects, calculating the at least one value includes using an input based on an age of relationship between the user and the at least one contact, and the age of relationship is calculated using a variable which varies sinusoidally over time once a minimum threshold has been reached.

In accordance with a fifteenth aspect of the present disclosure, which can be combined with any one or more of the previous aspects, calculating the at least one value includes accessing a digital calendar and using an input based on the digital calendar.

In accordance with a sixteenth aspect of the present disclosure, which can be combined with any one or more of the previous aspects, calculating the at least one value includes summing a plurality of variables based on the relationship between the user and the at least one contact.

In accordance with a seventeenth aspect of the present disclosure, which can be combined with any one or more of the previous aspects, calculating the at least one value includes multiplication of a value based on weighted keywords.

In accordance with an eighteenth aspect of the present disclosure, which can be combined with any one or more of the previous aspects, a method of developing relevant content for one or more contact is provided. The method includes receiving at least one input related to at least one contact, accessing public information related to the at least one contact, creating at least one keyword algorithm specific to the at least one contact by processing the at least one input and the public information using a pretrained model, identifying relevant content for the at least one contact by examining a plurality of content sources using the at least one keyword algorithm, and generating a suggested communication to be transmitted to the at least one contact based on a calculation using at least one value determined based on the keyword algorithm In accordance with a nineteenth aspect of the present disclosure, which can be combined with any one or more of the previous aspects, identifying the relevant content includes identifying a plurality of pieces of relevant content, and the method further includes ranking the plurality of pieces of relevant content based on the calculation using the at least one value determined based on the keyword algorithm.

In accordance with a twentieth aspect of the present disclosure, which can be combined with any one or more of the previous aspects, the method includes displaying the suggested communication on a user terminal, and enabling a user of the user terminal to edit and send the suggested communication to the at least one client.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
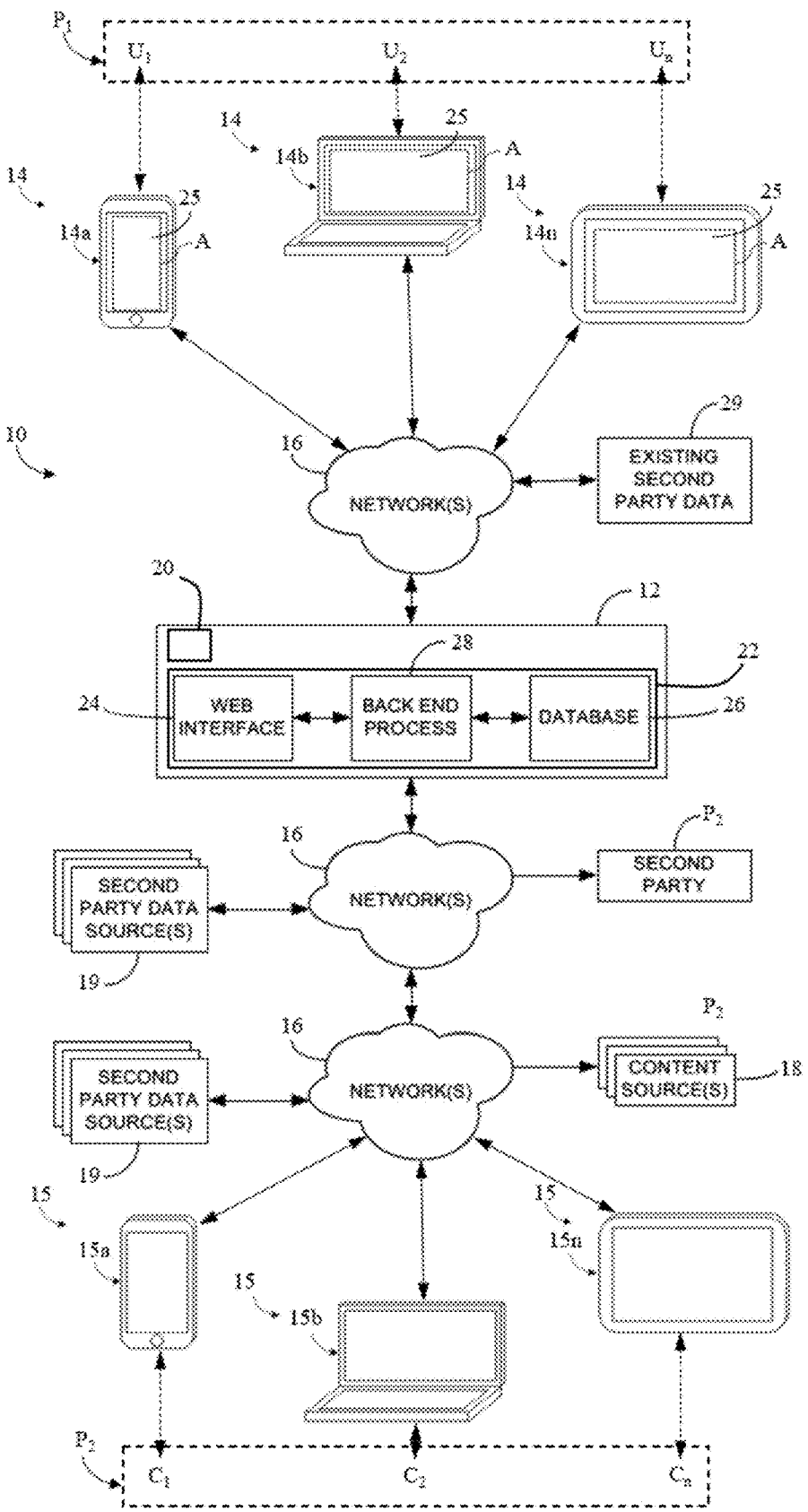
FIG. 1 illustrates an example embodiment of a system for managing and maintaining contact relationships in accordance with the present disclosure.

FIG. 1 illustrates an example embodiment of a system 10 for managing relationships. In the illustrated embodiment, the system 10 includes a central server 12 and one or more user terminals 14 operated by one or more users $U_1, U_2 \ldots U_n$ of a first party $P_1$. In use, the central server 12 can wirelessly communicate with each of the user terminals 14 via a network 16 to manage the first party $P_1$'s contact relationships. As described in more detail below, the central server 12 facilitates communications between one or more users $U_1, U_2 \ldots U_n$ of a first party $P_1$ and one or more contacts $C_1, C_2 \ldots C_n$ of a second party $P_2$, for example, via one or more contact terminals 15. As user herein, a "contact" can be an employee of the second party $P_2$.

Each of the plurality of user terminals 14 can be, for example, a cellular phone, a tablet, a personal computer, or another electronic device. Here, the plurality of user terminals 14 includes a first user terminal 14a, a second user terminal 14b, and an nth user terminal 14n. Each user terminal 14 can be controlled by a distinct user $U_1, U_2 \ldots U_n$ (e.g., a first user $U_1$ controls the first user terminal 14a, a second user $U_2$ controls the second user terminal 14b, and an nth user $U_n$ controls the nth user terminal 14n). The user $U_1, U_2 \ldots U_n$ of each user terminal 14 can be, for example, a member or employee of the first party $P_1$. As used herein, each of the users $U_1, U_2 \ldots U_n$ can also be referred to generally as a user U.

Likewise, each of the plurality of contact terminals 15 can be, for example, a cellular phone, a tablet, a personal computer, or another electronic device. Here, the plurality of contact terminals 15 includes a first contact terminal 15a, a second contact terminal 15b, and an nth contact terminal 15n. Each contact terminal 15 can be controlled by a distinct contact $C_1, C_2 \ldots C_n$ (e.g., a first contact $C_1$ controls the first contact terminal 15a, a second contact $C_2$ controls the second contact terminal 15b, and an nth contact $C_n$ controls the nth contact terminal 15n). The contact $C_1, C_2 \ldots C_n$ of each contact terminal 15 can be, for example, a member or employee of the second party $P_2$. As used herein, each of the contacts $C_1, C_2 \ldots C_n$ can also be referred to generally as a contact C.

The first party $P_1$ can include a single user U or group of users $U_1, U_2 \ldots U_n$ that desire to communicate with and/or provide content of interest to a single contact C or one or more contacts $C_1, C_2 \ldots C_n$ of the second party $P_2$. Although a single first party $P_1$ and a single second party $P_2$ are discussed herein for simplicity, it should be understood from this disclosure that the system 10 can operate to support any number of such parties and significantly decreases time spent on such communications as the number of parties increases. Content of interest to be provided to the second party $P_2$ can be obtained from one or more content sources 18 in communication with the central server 12 via one or more network 16. For example, the content sources 18 can include any of a number of commercially available third-party news sources accessible through known application protocol interfaces (APIs) for such news sources. For example, in the category of general business-related news, such content sources 18 can include services like Bloomberg, Financial Times, Wall Street Journal, New York Times, etc. The content sources 18 can also include other non-business content sources or more domain-specific content sources. Alternatively or additionally, content of interest can originate in a non-public database maintained by the first party $P_1$.

The user terminals 14 and contact terminals 15 can communicate with the central server 12 via various communication protocols, for example, via an Internet Protocol Suite or TCP/IP supporting HTTP. The network 16 can comprise a public network (e.g., the Internet, World Wide Web, etc.), a private network (e.g., local area network (LAN), etc.), and/or combinations thereof (e.g., a virtual private network, LAN connected to the Internet, etc.). The network 16 can include a wired network, a wireless network, and/or a combination of the two.

The central server 12 can comprise one or more server computers, database servers and/or other types of computing devices, particularly in connection with, for example, the implementation of websites and/or enterprise software. The central server 12 can further comprise a central processor 20 and a central memory 22. The central processor 20 is configured to execute instructions programmed into and/or stored by the central memory 22. As described in more detail below, the steps of the methods described herein can be stored as instructions in the central memory 22 and executed by the central processor 20.

In the illustrated embodiment, the central memory 22 can include a web interface 24, a database 26, and back end processing instructions 28. Here, the web interface 24, the database 26, and the back end processing instructions 28 can be controlled or accessed by the central processor 20 implementing appropriate software programs by executing the back end processing instructions 28 or other instructions programmed into and/or stored by the central memory 22.

The web interface 24 can provide a graphical user interface ("GUI") 25 that can be displayed on a terminal 14 for a user U, and can manage the transfer of data received from and sent to the GUI 25 on the terminal 14. For example, the GUI 25 can be employed by a user U to enter data about the second party $P_2$ or individual contacts C, to provide such data to the central server 12, and/or to present potential communications to one or more users U of the first party $P_1$, as described in more detail below. In an embodiment, each user terminal 14 can include an application A comprising software downloaded to and executed by the terminal 14 to provide the GUI 25 and to manage communications with the central server 12. The application A can be downloaded to the user terminal 14 from the central server 12 or from some other source such as an application distribution platform.

The database 26 can store data relevant to the second party $P_2$, as well as data concerning the identification and processing of content from the content source(s) 18. In an embodiment, the database 26 can comprise a database management system (DBMS) operating on one or more suitable database server computers. Alternatively, the database 26 can comprise storage components from other systems, such as an existing relationship management tool having relevant data concerning the contact C and/or second party $P_2$ already stored therein. Examples of data points concerning each tracked contact C and/or second party $P_2$ that can be stored in the database 26 include, but are not limited to: (i) first names of contacts $C_1, C_2 \ldots C_n$; (ii) the last names of contacts $C_1, C_2 \ldots C_n$; (iii) email addresses of contacts $C_1, C_2 \ldots C_n$; (iv) phone numbers of contacts $C_1, C_2 \ldots C_n$; (v) profile picture of contacts $C_1, C_2 \ldots C_n$; (vi) start and end dates of any past legal matters pertaining to the relationship between a user U and/or first party $P_1$ and a contact C and/or second party $P_2$; (vii) number of past work matters in the relationship between a user U and/or first party $P_1$ and a contact C and/or second party $P_2$; (viii) a short description of matter types worked on in the relationship between as user U and/or first party $P_1$ and a contact C and/or second party $P_2$; (ix) interests or goals of a contact C and/or second party $P_2$; (x) corresponding weights for each of the interests or goals of a contact C and/or second party $P_2$; (xi) dislikes of a contact C and/or second party $P_2$; (xii) family members names of contacts $C_1, C_2 \ldots C_n$; (xiii) family members' interests; (xiv) relationships of the family members to contacts $C_1, C_2 \ldots C_n$; (xv) significant events/data concerning a contact C and/or second party $P_2$; (xvi) one or more company name or alias for a second party $P_2$; (xvii) positions/titles of contacts $C_1, C_2 \ldots C_n$ within a second party $P_2$; (xviii) divisions/departments of contacts $C_1, C_2 \ldots C_n$ within a second party $P_2$; (xix) the length of the relationship between a user U and/or first party $P_1$ and a contact C and/or second party $P_2$; and (x) other individuals or entities involved in matters relationship between a user U and/or first party $P_1$ and a contact C and/or second party $P_2$.

The back end processing instructions 28 can be operatively coupled to both the web interface 24 and the database 26, and can be programmed into and/or stored by the central memory 22 and implemented by the central processor 20. In an embodiment, back end processing instructions 28 can be executed by the central processor 20 to direct operations of the central server 12 as described below in further detail. For example, the central processor 20, executing the back end processing instructions 28, can manage the receipt, storage, maintenance, etc. of relevant data (e.g., received from one or more user U of the first party $P_1$ via a terminal 14) concerning one or more contact and/or the second party $P_2$. Additionally, the central processor 20, executing the back end processing instructions 28, can develop similar data relevant to one or more contact C and/or the second party $P_2$ based on information obtained from the second party data sources 19 and/or existing second party databases 29. Similarly, the central processor 20, executing the back end processing instructions 28, can implement functions that identify specific relevant content from the content sources 18 that can be optimal for presentation to one or more of the contact C and/or the second party $P_2$, as well as further functions discussed in more detail below.

Figure 2:
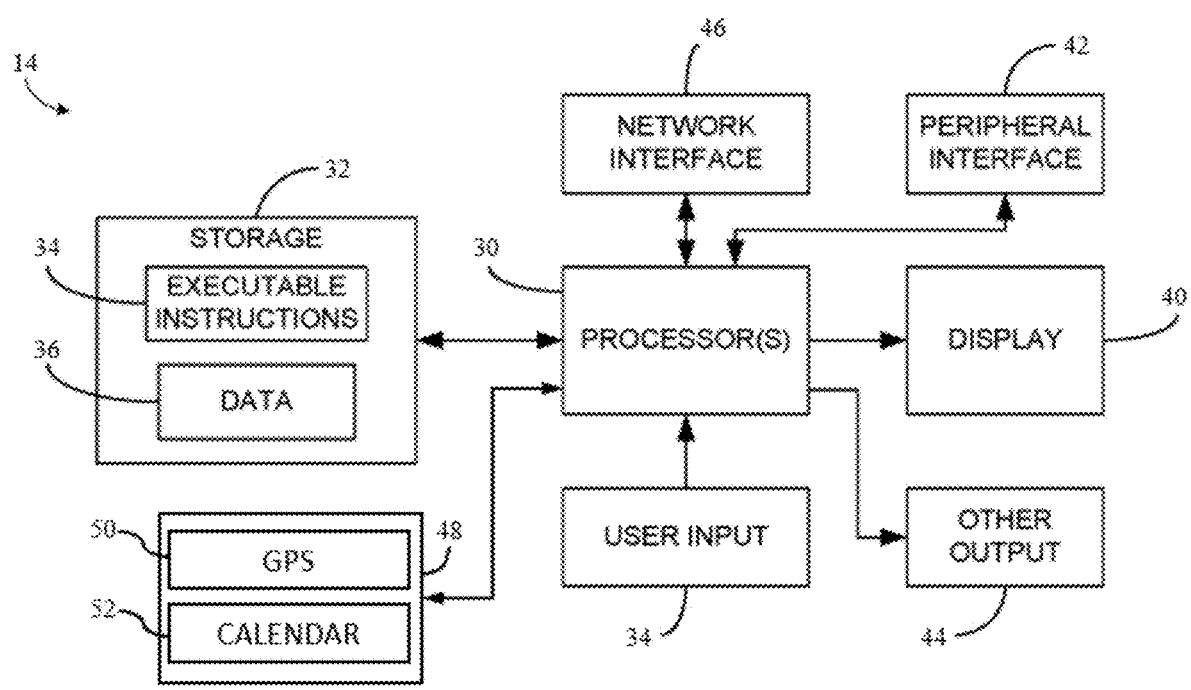
FIG. 2 is a representative diagram of an example embodiment of a user terminal or a contact terminal which can be used in the system of FIG. 1.

FIG. 2 illustrates a representative diagram of an example embodiment of a user terminal 14. As illustrated, a user terminal 14 can include a terminal processor 30 and a terminal memory 32. The terminal processor 30 is configured to execute instructions programmed into and/or stored by the terminal memory 32. The instructions can be received from and/or periodically updated by the web interface 24 of the central server 12 in accordance with the methods discussed below. As described in more detail below, many of the functions described herein can be stored as instructions in the terminal memory 32 and executed by the terminal processor 30.

In an embodiment, the terminal processor 30 can comprise one or more of a microprocessor, microcontroller, digital signal processor, co-processor or the like or combinations thereof capable of executing stored instructions 34 and operating upon stored user data 36, wherein the instructions 34 and/or stored user data 36 are stored by the terminal memory 32. Likewise, the terminal memory 32 can comprise one or more devices such as volatile or nonvolatile memory, for example, random access memory (RAM) or read only memory (ROM). Further still, the terminal memory 32 can be embodied in a variety of forms, such as a hard drive, optical disc drive, floppy disc drive, etc. In an embodiment, many of the processing techniques described herein are implemented as a combination of executable instructions 34 and data 36 stored within the terminal memory 32.

As illustrated, each of the plurality of user terminals 14 includes one or more user input device 38, a display 40, a peripheral interface 42, one or more other output device 44, and a network interface 46 in communication with the terminal processor 30. The user input device 38 can include any mechanism for providing a user input to the terminal processor 30, for example, a keyboard, a mouse, a touch screen, a microphone and/or suitable voice recognition application, or another input mechanism. The display 40 can include any conventional display mechanism such as a cathode ray tube (CRT), a flat panel display, a touch screen, or another display mechanism. Thus, as can be understood, the user input device 38 and/or the display 40 and/or any other suitable element can be considered a GUI 25. The peripheral interface 42 can include the hardware, firmware, and/or other software necessary for communication with various peripheral devices, such as media drives (e.g., magnetic disk or optical disk drives), other processing devices, or another input source used as described herein. Likewise, the other output device 44 can optionally include similar media drive mechanisms, other processing devices or other output destinations capable of providing information to a user of the user terminal 14, such as speakers, LEDs, tactile outputs, etc. The network interface 46 can comprise hardware, firmware and/or software that allows the terminal processor 30 to communicate with other devices via wired or wireless networks 16, whether local or wide area, private or public. For example, such networks 16 can include the World Wide Web or Internet, or private enterprise networks, or the like.

In various embodiments discussed herein, the user terminal 14 can include one or more user tracking device 48 configured to track and/or periodically gather user data 36 regarding the user U of the user terminal 14. Such a tracking device can include, for example, a global positioning system ("GPS") device 50, a digital calendar 52, and/or another terminal-specific device which tracks movements and/or data usage by the user U of the user terminal 14. The GPS device 50 can be used, for example, to record past or present data regarding the physical location of the user terminal 14. The digital calendar 52 can be used, for example, to record past, present, or future data regarding the user U's schedule.

While the user terminal 14 has been described as one form for implementing the techniques described herein, those having ordinary skill in the art will appreciate from this disclosure that other functionally equivalent techniques can be employed. For example, some or all of the functionality implemented via executable instructions can also be implemented using firmware and/or hardware devices such as application specific integrated circuits (ASICs), programmable logic arrays, state machines, etc. Further, other implementations of the user terminal 14 can include a greater or lesser numbers of components than those illustrated. Further still, although a single user terminal 14 is illustrated in FIG. 2, it should be understood from this disclosure that a combination of such devices can be configured to operate in conjunction (for example, using known networking techniques) to implement the methods described herein. It should also be understood from this disclosure that the contact terminals 15 can include the same elements as the user terminals 14.

In an embodiment, the system 10 illustrated in FIGS. 1 and 2 functions as a tool to assist one or more user U and/or first party $P_1$ in managing relationships with one or more of contact C and/or second party $P_2$. A more detailed implementation of system 10 is further illustrated in FIG. 3, which is a functional block diagram of structure for implementing the system 10 in accordance with the instant disclosure. By using the system 10 in accordance with the techniques described herein, one or more user U can automatically contact one or more of the contact $C_1, C_2 \ldots C_n$ of a second party $P_2$ at optimal times and/or with optimized and up-to-date content of interest.

In an embodiment, the system 10 functions as a personal customer relations management (CRM) system. Based on data from an existing second party database 29 (e.g., as found in a legacy CRM system or a contact intake system, accessible via the network 16) or via data provided by the first party $P_1$, the central processor 20 can execute the back end processing instructions 28 to develop a basic profile 60 for a plurality of contacts $C_1, C_2 \ldots C_n$ of a plurality of second parties $P_2$ based on various types of data, for example, the types described above. Additionally, as described in greater detail below, the central processor 20 can execute the back end processing instructions 28 to utilize the second party data sources 19 to develop a list of keywords related to an individual contact C and/or the second party $P_2$ generally. For example, interests of a contact C and/or second party $P_2$ interests can include their personal and/or professional interests. The central processor 20 can assign weights to the interests to indicate their importance to an individual contact C and/or second party $P_2$ and/or their relevance to the industry of an individual contact C and/or second party $P_2$. In an embodiment, such weights can be assigned either manually or automatically depending on the nature of particular interest. In an embodiment, the weights can be assigned by at least one neural network 65 which has been trained with other content of interest to the contact C and/or second party $P_2$, as discussed in more detail below. In an embodiment, personal interests (e.g., family, sports, food, hobbies, favorite destinations, etc.) are treated separately from professional interests. Professional interests are treated as things that relate to a contact C's work life and therefore can be beneficial for a user U of the first party $P_1$ to share in terms of gaining business from the contact C and/or second party $P_2$. On the other hand, personal interests are more relevant for relationship building as opposed to potential business leads. Thus, in terms of weighting, keywords pertaining to professional interests can be weighted heavier if they are found to be more relevant to a contact C's work life, and therefore trends relating to these words will be more applicable to the contact C and/or second party $P_2$. In an embodiment, central processor 20 automatically weights professional interests. For example, and as further described below, keywords that are extracted from the description of a company can be used to obtain news content returning a collection of documents. Weights can then be assigned to the keywords according to the magnitude of the vectors obtained from an inverse document frequency (tf-idf) algorithm performed on the keywords and the collection of documents. For example, a tf-idf value can be generated for one or more keywords, wherein the tf-idf value increases proportionally to the number of times the keyword appears. The tf-idf value can then be converted to a numerical weight, for example, to a numerical value between 0 and 1.

In another embodiment, keywords pertaining to a contact C's personal interests can be weighted by one or more user U of the first party $P_1$ directly based on the user U's personal knowledge of the contact C and/or the second party $P_2$. For example, if a contact C has a high affinity for a local sports team, the user U can weight this higher than a restaurant the contact C has mentioned one or twice. Further, previously provided information about the second party $P_2$ can be updated as needed. In an embodiment, the weights applied to personal interests can be on the same numerical scale as the weights applied to professional interests. Alternatively, if the intention is to place more value on professional interests, then the weights applied to personal interests can be on a smaller numerical scale as the weights applied to professional interests. For example, if the professional interests are weighted on a 0 to 1 scale (e.g., based on tf-idf values as discussed above), the personal interests can be weighted on a 0 to 0.5 scale, with the minimum scale value being the same for both professional and personal interests, but with the maximum scale value being higher for the professional interests than the personal interests. If personal interests are being valued more than professional interests, then the opposite scales can also be used. Those of ordinary skill in the art will recognize from this disclosure that additional categories can also be included besides personal and professional interests.

In an embodiment, the central processor 20 can execute the back end processing instructions 28 to periodically suggest that one or more U of a first party $P_1$ should contact one or more contact C of a second party $P_2$. Generally, it is desirable to ensure that contacts with a particular contact C of the second party $P_2$ are not too frequent, but to also ensure that any content communicated to a contact C is not outdated. In an embodiment, the following variables can be assessed for this purpose: (i) the time since the last automated communication, (ii) the age of the relationship, (iii) time since the last working engagement between the parties, and (iv) the relevance of potential content to be communicated. In an embodiment, each of these variables can assigned a value between a minimum and maximum value, here 0 and 1, inclusive, and each can be given weights. In an embodiment, the time since the last working engagement can be assigned a value $(V_T)$ according to a linear relationship with time until the value plateaus after X weeks. Similarly, the age of the relationship between the parties does not have a role in suggesting timing (i.e., has a 0 value) unless it is above Y years in length. After the age of the relationship has reached Y years in length, the value $(V_A)$ assigned to this variable can vary sinusoidally over time until the occurrence of significant events between parties (e.g., the contact C's birthday), at which time the value is maximized. In an implementation, both the time since last working engagement and age of the relationship variables can be given equal weights. The variable of time since last automated communication $(V_C)$ can be calculated similarly to the time since last engagement variable, although be weighted less (e.g., have a linear relationship with time until the value plateaus after X weeks). In an embodiment, the value $(V_F)$ for the relevance of a particular piece of content can be scored on a scale of 0-1 based on its similarities relative to the weighted keywords, as described above.

Based on these example variables, the central server 12 can assess whether a given piece of identified content should be flagged for communication to one or more contact C of a second party $P_2$. In an embodiment, the central server 12 can perform a first calculation to assess whether a given piece of identified content should be flagged for potential communication. In particular, the values of the first three variables (time since the last working engagement $(V_T)$, age of the relationship $(V_A)$, and time since the last automated communication $(V_C)$) can be summed in the first calculation to calculate a value $(V_S)$ above a minimum threshold and/or below a maximum threshold. Here, with $V_T$, $V_A$, and $V_C$ being between 0 and 1, the sum value $V_S$ will be above a minimum value of 0 and below a maximum value of 3. Thus, for example, the value $V_S$ can be calculated as follows:

$$V_S = V_T + V_A + V_C \quad \text{(Equation 1).}$$

In an embodiment, the central server 12 will retrieve content for potential communication unless $V_S$ is above a minimum threshold. Alternatively, the central server 12 can continue when the relevance of the content outweighs the timing of the communication.

The central server 12 can then perform a second calculation which incorporates the value $(V_F)$ for the content's relevance to one or more contact C and/or second party $P_2$. In an embodiment, the sum value $(V_S)$ from Equation 1 can be multiplied by the value $(V_F)$ for the content's relevance to determine a resulting value (V). Thus, for example, the value V can be calculated as follows:

$$V = V_S \times V_F \quad \text{(Equation 2).}$$

Alternatively, Equations 1 and 2 can combined into a single calculation as follows:

$$V = V_F(V_T + V_A + V_C) \quad \text{(Equation 3).}$$

It should further be understood from this disclosure that additional variables can also be included in the calculation to further optimize the equation for accurate results. Further, the Equations disclosed above are examples only, are not intended to be limiting, and can be adjusted to achieve the values $V_S$ and/or V in other ways which determine a numerical value that takes into account the timing and/or relevance. In an embodiment, at least one neural network 65 can develop alternative algorithms based on content known to be of interest to a contact C and/or second party $P_2$.

Using the above equations, if the resulting value V is over a minimum threshold value (e.g., 2 in this example), then the conditions are satisfied for flagging the particular piece of content for communication to one or more contact C of the second party $P_2$ and generating a suggested communication as discussed below. In this manner, particularly relevant content can serve as the basis for a potential communication even if the temporally-based variables do not indicate a strong need for sending a communication. On the other hand, comparatively less relevant content can nonetheless be flagged as the basis for a potential communication when the temporally-based variables indicate a greater need to reach out to the contact C. In practice, the values of the X and Y thresholds noted above can be set (e.g., by at least one neural network) through machine learning analysis of the acceptance and/or rejections of suggested communications by the contact C and/or second party $P_2$. In this manner, the system 10 can tailor the frequency of communications to the desires of the user U and/or contact C as the process is repeated.

Further still, the central processor 20 can execute the back end processing instructions 28 to interface with the user U's digital calendar 52 (as maintained, for example, by a user terminal 14) to determine when an interaction with one or more contact C of the second party P₂ is about to or has already occurred, so that previously captured interests can be suggested as talking points for upcoming interactions, and/or additional interests that the user U gleaned from a recently completed interaction can be captured. For example, with knowledge of an upcoming meeting with a given contact C obtained from the user U's digital calendar 52, the central processor 20 can send the user U's terminal 14 a reminder before the meeting reminding the user U of recent/relevant (based on weight) interest information. Additionally, with knowledge that a meeting between the user U and the contact C recently ended according to the user U's digital calendar 52, the central processor 20 can send the user U's first terminal 14 a notification requesting the user U to enter any new interest information that can have been learned during the recent meeting. In this way, interests discovered during a recent meeting can be weighed more heavily during a content analysis as discussed herein.

Figure 3:
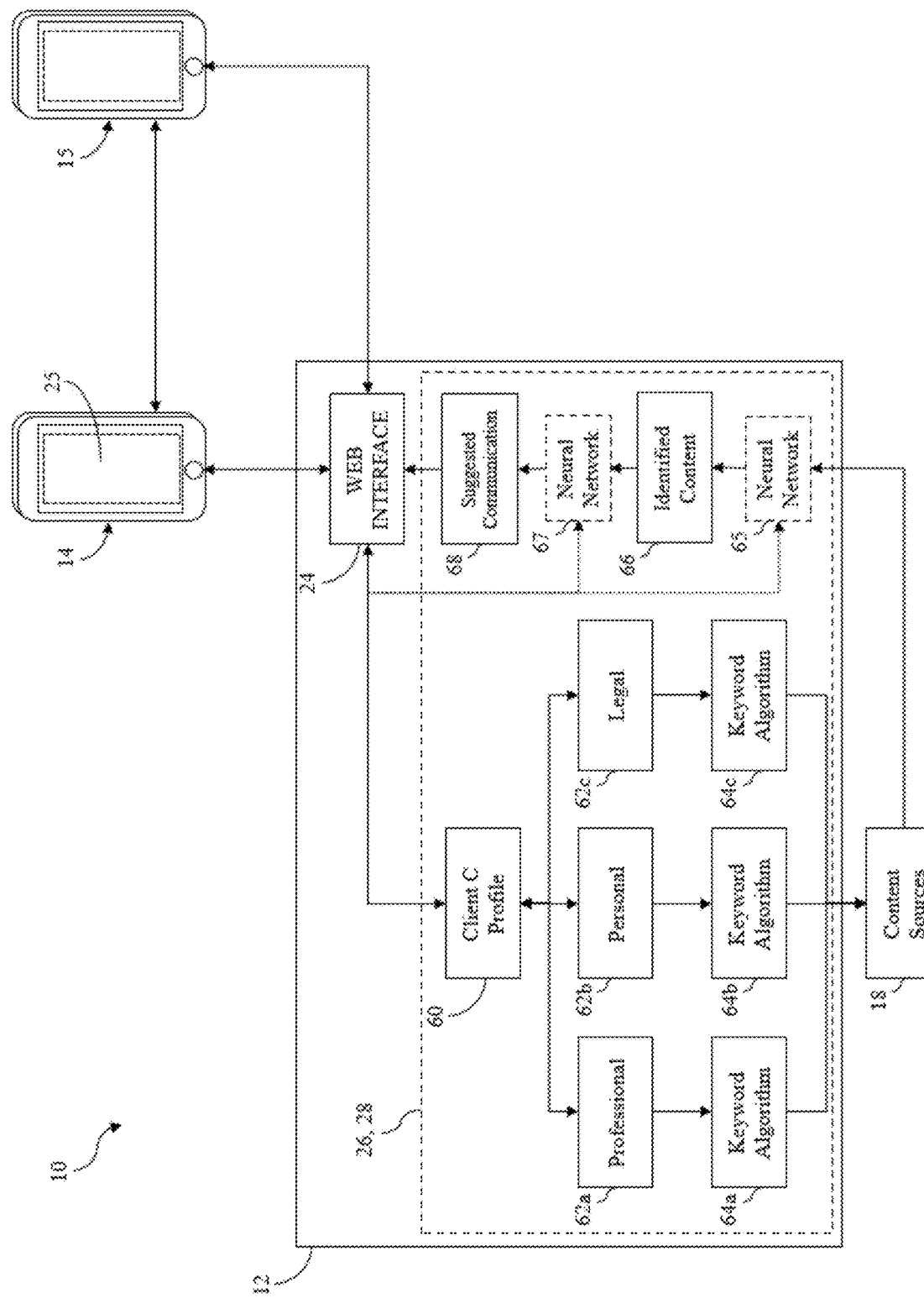
FIG. 3 is an example embodiment of a functional block diagram illustrating the systems and methods of the present disclosure.

FIG. 3 illustrates an example embodiment of a functional block diagram of the system 10 according to the present disclosure. In particular, and in addition to the user functions described above, FIG. 3 illustrates various functions implemented by the central processor 20 while executing the back end processing instructions 28.

In the illustrated embodiment, the central processor 20 creates and maintains a plurality of contact profiles 60 within the database 26 by executing the back end processing instructions 28. In FIG. 3, only one contact profile 60 is shown, but it should be understood from this disclosure that the central processor 20 can create and maintain a plurality of contact profiles 60 for a plurality of contacts C either within the same second party P₂ or from multiple different second parties P₂. By way of non-limiting example, and in the context of the legal profession, the user U of the user terminal 14 can be an attorney in private practice having relationships with various other attorneys or contacts (e.g., contacts $C_1, C_2 \ldots C_n$) at contact organizations, other private practice firms, foreign counsel, etc. (e.g., second parties P₂). The first party P₁ can be the user U's law firm and can include a plurality of other users $U_1, U_2 \ldots U_n$ having individual user terminals 14.

Here, each contact profile 60 can include one or more records 62, stored in the database 26, having different types of data, as described above, corresponding to the contact C and/or the second party P₂. For example, and continuing with the legal profession scenario, in the illustrated embodiment the contact profile 60 can comprise data 62 separated into categories of professional data 62a, personal data 62b, and legal data 62c pertinent to each second party P₂. In this example, the professional data 62a can document data concerning the contact C's employer, industry, specific role with that employer or within that industry, etc.; the personal data 62b can document data concerning the contact C's personal information such as full name, birthday, family members, hobbies, likes, dislikes, etc.; and the legal data 62c can document data concerning the user U's and/or first party P₁'s past legal engagements with the particular contact C and/or second party P₂. Here, the professional data 62a, personal data 62b and/or legal data 62c (each potentially including extracted keywords as described herein) can serve as a basis for performing searches at the content sources 18 to identify potentially relevant content 66 for the client C and/or second party P₂. It should be appreciated from this disclosure that further examples of specific data types can be incorporated into the professional data 62a, personal data 62b and legal data 62c, or that different categories could be employed. For example, one or more of the professional data 62a, personal data 62b and/or legal data 62c can include content known to be of interest to a client C and/or second party P₂ which can be used to train a neural network 65 to identify similar content.

The central processor 20 can build each profile 60 in a variety of ways, some of which are described in more detail below. In an embodiment, a user U can enter known data 62 about a contact C and/or second party P₂ into a user terminal 14, which data 62 can then be saved by database 26. Here, if a user U enters data about a second party P₂, then that data can also be saved to the profiles 60 of other contacts $C_1, C_2 \ldots C_n$ employed by the same second party P₂. The user U can also upload or link content known to be of interest to a client C and/or second party P₂ which can then be used to train a neural network 65 to identify similar content. Additionally, the central processor 20 can build the profile by obtaining data from second party data sources 19 and/or existing second party databases 29, as explained in more detail below.

Although a contact profile 60 is shown, the profile 60 can also be generally for a second party P₂, and can relate to multiple contacts $C_1, C_2 \ldots C_n$ employed by the second party. When relevant content is discovered by the central processor 20 as described herein, the central processor 20 can then determine which of the contacts $C_1, C_2 \ldots C_n$ would be optimal to receive the content. In an embodiment, the central processor 20 can calculate at least one content score ($S_C$) for each of the contacts $C_1, C_2 \ldots C_n$ of the second party P₂ using professional data 62a, personal data 62b, legal data 62c and/or other data for each contact $C_1, C_2 \ldots C_n$. For example, in an embodiment using professional data 62a and personal data 62b, a content score ($S_C$) can be calculated as follows:

$$S_C = ((V_S \times V_{F1}) + (V_S \times V_{F2}))/n \qquad \text{(Equation 4)}.$$

Here, $V_{F1}$ is a value for relevance to a contact's professional interests, and $V_{F2}$ is a value for relevance to that contact's personal interests, and n is a number of interest categories being considered (here, e.g., 2). $V_S$ can be calculated, for example, according to the equations discussed above or similar derivative or alternative calculations. In this embodiment, since the contacts $C_1, C_2 \ldots C_n$ may likely have similar or the same professional data 62a from having been employed by the same second party P₂, the personal data 62b used to calculate $V_{F2}$ for each of the multiple contacts $C_1, C_2 \ldots C_n$ can be the determining factor as to which contact $C_1, C_2 \ldots C_n$ the central server recommends receives the identified content.

In an embodiment, the central processor 20 can execute the back end processing instructions 28 to implement one or more keyword extraction algorithm 64 that can be used to develop, in this case, more data 62 for one or more profile 60. In FIG. 3, the central processor 20 has implemented a first keyword extraction algorithm 64a for the professional data 62a, a second keyword extraction algorithm 64b for the personal data 62b, and a third keyword extraction algorithm 64c for the legal data 62c. Each keyword extraction algorithm 64 can be used to analyze the content sources 18 and/or second party data sources 19 to extract keywords that can be beneficial in identifying content of relevance to the second party 112. In another embodiment, the first keyword extraction algorithm 64a, the second keyword extraction algorithm 64b, and the third keyword extraction algorithm 64c can be combined into a single algorithm 64. In an embodiment, one or more keyword extraction algorithm 64 can be developed by at least one neural network 65 using positive and/or negative examples of known content relevant to the client C.

Figure 4:
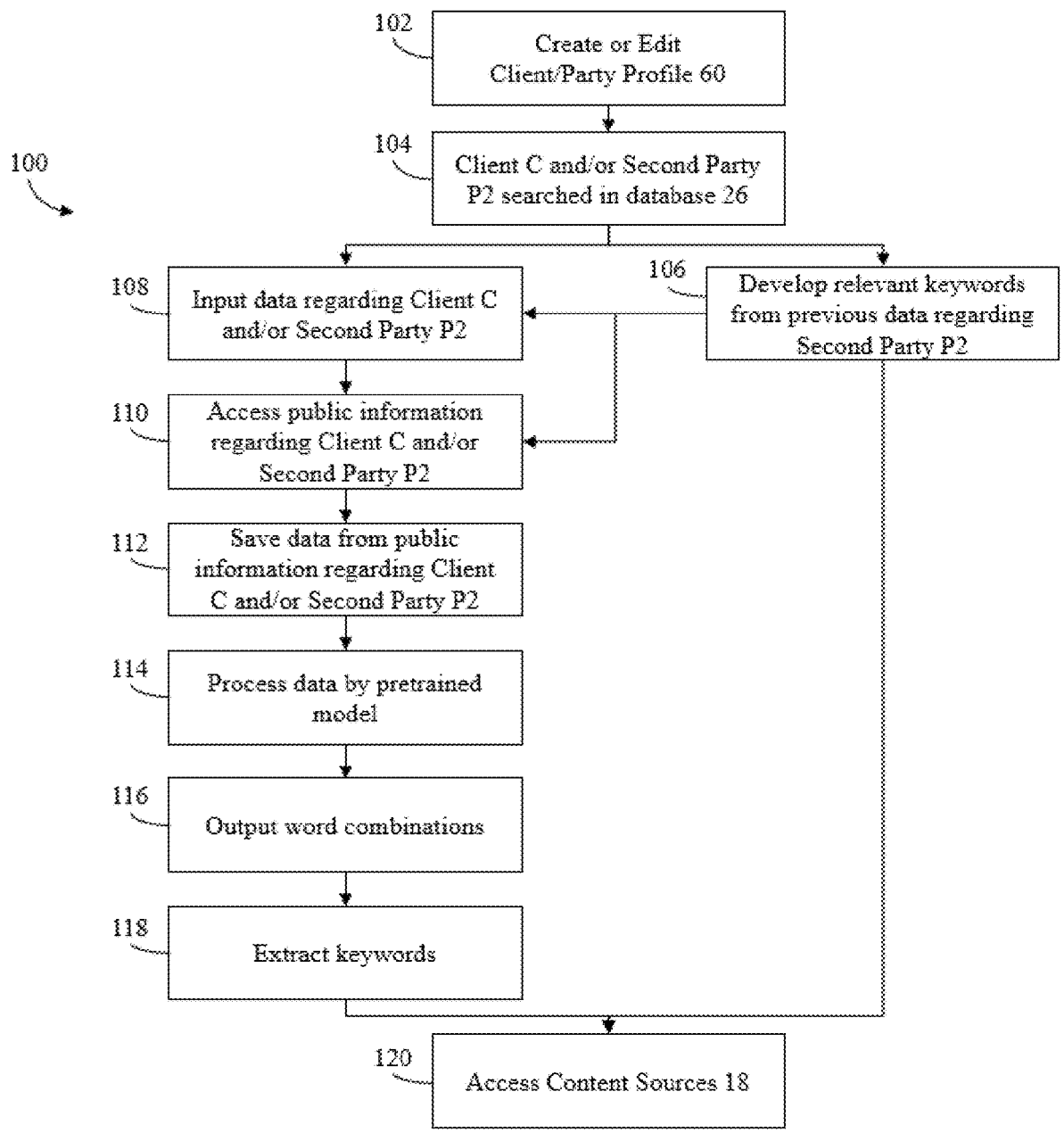
FIG. 4 illustrates an example embodiment of a method for creating or editing a profile and executing a keyword extraction algorithm using the system of FIG. 1.

FIG. 4 illustrates an example embodiment of a method 100 for developing and executing a keyword extraction algorithm 64 according to the present disclosure. Some or all of the steps of method 100 can be stored as instructions on the central memory 22 and/or one or more terminal memory 32 and can be executed by the central processor 20 and/or one or more terminal processor 30 in accordance with the respective instructions stored on the central memory 22 and/or one or more terminal memory 32. It should be understood that some of the steps described herein can be reordered or omitted without departing from the spirit or scope of method 100.

Beginning at step 102, a user U logs into a user terminal 14 and accesses the system 10 to create or edit a profile 60. The profile 60 can be for a contact C and/or more generally for a second party $P_2$. That is, the user U can create or edit a profile 60 for a particular contact C of the second party $P_2$, or the user U can create or edit a profile 60 for a particular second party $P_2$, which can apply to multiple contacts $C_1, C_2 \ldots C_n$ employed by the second party $P_2$.

In an embodiment, users $U_1, U_2 \ldots U_n$ of the same first party $P_1$ can have differing levels of access for entering and/or editing client C and/or second party $P_2$ information. For example, one or more user $U_1, U_2 \ldots U_n$ with top level access can be allowed to create or edit profiles 60, while other users $U_1, U_2 \ldots U_n$ can merely perform a search as described below. Alternatively, the user U creating a profile 60 can be allowed to edit that profile 60, while other users $U_1, U_2 \ldots U_n$ can merely perform a search as described below.

At step 104, the central processor 20 executes the back end processing instructions 28 to search the database 26 for information related to the client C and/or second party $P_2$. If the database 26 already contains previous data regarding the client C and/or second party $P_2$, which for example can be saved as one or more category of data 62, the system 10 can in an embodiment develop relevant keywords from the previous data at step 106 and thereafter access the content sources 18 at step 120. For example, the central processor 20 can identify repeated keywords related to the client C and/or second party $P_2$ and thereafter determine the importance of the keywords based on the number of repetitions. Alternatively, the information within the database 26 can already include keywords related to the client C and/or second party $P_2$ which have been verified to be accurate by at least one user U of the first party $P_1$. Alternatively or additionally, at least one neural network 65 can be used to identify keywords and/or corresponding algorithms.

In another embodiment, the central processor 20 can access the previous data to develop an initial set of keywords, and then allow further data to be input by the user U at step 108 or move on to step 110. Here, the central server 12 can also automatically access existing second party database 29 from outside servers to search for data from outside sources regarding the client C and/or second party $P_2$. When information regarding the client C and/or second party $P_2$ is found, the central server 12 can update the previous data regarding the client C and/or second party $P_2$.

At step 108, the user U can input data regarding the contact C and/or second party $P_2$ via the GUI 25 of a user terminal 14. In an embodiment, the user U can enter initial keywords regarding the contact C and/or second party $P_2$ which can then be saved in the database as professional data 62a, personal data 62b, and/or legal data 62c depending on the type of data entered. The user U can also enter information about the second party $P_2$, which information can then be applied to the professional data 62a and/or legal data 62c of a plurality of different profiles 60 for a plurality of different contacts $C_1, C_2 \ldots C_n$ employed by the second party $P_2$. The user U can also upload or link content known to be of interest to a client C and/or second party $P_2$ which can then be used to train a neural network 65 to identify similar content. In an embodiment, the central processor 20 can implement the back end processing instructions 28 to take the user's entered keywords and develop additional keywords with the same or similar meaning. At this time, the user U can also enter weights for different keywords or interests, for example, by ranking the keywords or interests on a numerical or sliding scale based on the user's understanding of the client C and/or second party $P_2$. In an embodiment, the weights can then be converted by the central processor 20 into a numerical value on a different scale (e.g., a 0 to 1 scale).

In an embodiment, the data input can be accomplished by enabling the central server 12 to access the digital calendar 52 of the user terminal 14 and/or emails between the contact C and the user U as saved on the user terminal 14 or another location. For example, if the user U has met with the contact or exchanged emails having descriptions involving professional, personal, or legal interests, then the central server 12 can access and save those descriptions to the database 26. Here, the central server 12 can scan those descriptions and pull keywords that may be of interest to the client C. In an embodiment, the proposed keywords from the digital calendar 52 and/or email correspondence can be presented to the user U via the user terminal 14 and verified and/or weighted by the user U before progressing to the next step of method 100.

At step 110, the central server 12 can access the second party data sources 19 to search for data regarding the contact C and/or second party $P_2$. The second party data sources 19 can include, for example, one or more social media profile of the contact C, one or more social media profile of the second party $P_2$, the second party $P_2$'s official website, and/or outside new articles written about the contact C and/or second party $P_2$. In an embodiment, the central server 12 can perform a public search of the second party data sources 19 using the name of the contact C and/or second party $P_2$ as a keyword. In another embodiment, the central server 12 can perform a public search by combining this information with other data input by the user U at step 108. For example, "LinkedIn" is a well-known social network for business professionals, and an API for the "Linkedin" social network can be used by the central server 12 to search for information regarding the contact C and/or second party $P_2$. Of course, it should be appreciated from this disclosure that other similar data sources can also be employed for this purpose. Certain social media platforms known for professional or personal data can be known to the central server 12 and used to collect professional data 62a or personal data 62b, respectively.

At step 112, presuming that the central server 12's search located the contact C and/or second party $P_2$ within one or more second party data source 19, one or more textual description of the contact C and/or second party $P_2$ can be retrieved. For example, the descriptions can include summaries listed on one or more social media profile of the contact C, one or more social media profile of the second party $P_2$, the second party $P_2$'s official website, and/or outside new articles written about the contact C and/or second party $P_2$. In an embodiment, the central server 12 can conserve storage space and processing power by condensing the descriptions by removing unneeded words such as common grammatical terms. Here, the central server 12 can further separate the descriptions into professional data 62a, personal data 62b, and/or legal data 62c. For example, data from the second party $P_2$'s website or social media account can be saved in the database 26 as professional data 62; data from the contact's personal social media account can be saved in the database 26 as personal data 62b; and data from the first party $P_1$'s own databases (e.g., in the law firm scenario) such as from such as from the existing second party database 29 can be saved in the database 26 as legal data 62c.

In an embodiment, the central server 12 can be trained or programmed prior to performing step 112 to distinguish professional and personal websites based on historical information and the intent of those websites. For example, the central server 12 can be programmed or trained to identify certain social media websites as being used more for personal or professional reasons. Central server 12 can further be trained or programmed to identify certain words as relating to business or personal interests. For example, names of sports teams within a profile would likely relate to personal interests, whereas names of vendors would likely relate to professional interests. In an embodiment, the user U can be prompted via the GUI 25 of a user terminal 14 to categorize certain keywords determined during step 112.

At step 114, the saved input data from step 108 and/or the saved public data from step 112 can be processed by the central processor 20 according to a pretrained model executed according to the back end processing instructions 28. The pretrained model can be trained, for example, by using machine learning training which utilizes known descriptions along with expected keyword outputs from the known descriptions (e.g., via at least one neural network). For example, in one embodiment, an entity recognizer that has been trained on manually labeled data from the English language can be employed to identify named entities (e.g., people, organizations, products, laws, events, locations and building names) in the textual descriptions, which identified entity names can then be treated as keywords. Further keyphrases (as opposed to individual keywords) can be identified according to rules applied to the previously-identified named entities. For example, the following structural combinations can be used to identify further keyphrases: a named entity noun followed by the word "company," a named entity noun followed by the word "industry," or an adjective followed by a named entity noun or a verb followed by a named entity noun (as in the case of a phrase indicating a named entity's actions). Additionally, the method 100 can be performed based on personal or legal data. For example, the contact C's residential town or city (as might be found in the personal data 62b) could be treated in the same manner as the second party $P_2$'s company. Alternatively, a named litigant from a legal matter identified in the legal data 62c can be processed in this manner to develop further insight into the second party $P_2$.

At step 116, the central processor 20 can execute the back end programming instructions 28 to output generic combinations of words based on the specified definition of a keyword at step 114. In an embodiment, the central processor 20 can use natural language processing to output the generic combinations of words. In an embodiment, the central processor 20 can transmit the generic combinations of words back to the user terminal 14 for the user U to at least one of: (i) confirm that the word combinations relate to the contact C and/or second party $P_2$; (ii) specify whether the combinations relate to one of a plurality of categories such as professional data 62a, personal data 62b, and/or legal data 62c; and/or (iii) weight or rank the combinations of words based on perceived importance to the contact C and/or second party $P_2$.

At step 118, the central processor 20 can execute the back end programming instructions 28 to extract keywords from the combinations of words determined at step 116. The keywords can be based, for example, on predetermined relationships between keywords and phrases, on the number of times different terms or phrases show up amongst the previously determined combinations, and/or on the user U's input before or after viewing the previously determined combinations. Here, the keywords can also be categorized, for example, as professional data 62a, personal data 62b, and/or legal data 62c, or in a number of other categories. In an embodiment, the central processor 20 can transmit the keywords back to the user terminal 14 for the user U to at least one of: (i) confirm that the keywords relate to the contact C and/or second party $P_2$; (ii) specify whether the keywords relate to one of a plurality of categories such as professional data 62a, personal data 62b, and/or legal data 62c; and/or (iii) weight or rank the keywords based on perceived importance to the contact C and/or second party $P_2$. Using this data, the central processor can create one or more keyword extraction algorithm 64 capable of highlighting content with corresponding keywords.

In an embodiment, keywords or combinations of words relating to the second party $P_2$ can also be saved within database 26 to the profiles 60 of other contacts $C_1, C_2 \ldots C_n$ employed by the same second party $P_2$. For example, professional data 62a and/or legal data 62c of a second party $P_2$ can in some embodiments equally apply to all $C_1, C_2 \ldots C_n$ employed by the same second party $P_2$. In this way, the profiles of various contacts C employed by the same second party $P_2$ remain up to date and consistent with each other.

At step 120, the central server 12 accesses the content sources 18 using at least one keyword extraction algorithm 64 for the contact C and/or second party $P_2$. Here, the content sources 18 can include any of a number of commercially available news sources, non-business content sources, domain-specific content sources, or any other sources with information that could be of interest to the contact C and/or second party $P_2$. In an embodiment, the central server 12 can also search the central memory 22 for content created by the first party $P_1$, which may not be publicly accessible content.

Returning to FIG. 3, after accessing the content sources 18, the central server 12 can identify content 66 determined to be relevant to the contact C and/or second party $P_2$ based on the one or more keyword extraction algorithm 64. The identified content 66 can be determined to be relevant, for example, based on the importance of the keywords as determined by the user U and/or first party $P_1$. The central controller 20 can assign each piece of identified content a numerical value. In an embodiment, the numerical value can be determined by Equations 1, 2, and/or 3 discussed above, or derivatives or alternatives thereof (e.g., as developed by at least one neural network). Here, when the numerical value for more than one content source 18 includes identified content 66 that meets a minimum threshold, the central server 12 can rank the identified content 66 according to presumed interest to the contact C and/or second party $P_2$.

For example, to limit the user U to a single communication to the contact C, the central server 12 can narrow a plurality of potentially relevant identified content 66 to only the most relevant or applicable content to the contact C. Here, the central server 12 can automatically narrow the identified content 66 based on weightings applied to the keywords, or the user U can be presented via the GUI 25 of the user terminal 14 with a ranked list of identified content 66, from which the user U can choose which identified content 66 to send to the contact. The identified content 66 can be saved within database 26, for example, in the form of links to the actual digital content at the respective content sources 18. The identified content 66 can be saved in database 26 for further processing. Additionally, the identified content 66, though shown as separate element in FIG. 3, can be included in or otherwise associated with profile 60.

In an embodiment, each discrete identified content element can be ranked according to weighting applied to the search terms (e.g., keywords) used to identify that particular content. For example, keywords pertaining to a second party $P_2$'s company can be more heavily weighted than keywords concerning personal aspects of the individual contacts $C_1$, $C_2$ ... $C_n$ of the second party $P_2$. Thus, a particular content element that is more strongly identified with a company-related keyword (as determined, for example, by a frequency of occurrence metric) will be deemed more relevant as opposed to another content element that is more strongly identified with a personal-related keyword. Alternatively, a contact C's personal interest can outweigh professional interests if a user U has a personal relationship with the contact C. The weights can be set by the user U and/or first party $P_1$ on a case-by-case basis, or can be set for all contacts C and/or second parties $P_2$ using the same global rules.

Additionally, or in an alternative embodiment, the central memory 22 can include at least one neural network 65 which can be trained to locate relevant content for a particular user U and/or client C and flag the relevant content as identified content 66. Here, the neural network 65 can be trained using one or more previously identified pieces of content identified by the user U to be relevant to a client C and/or second party $P_2$. Through the training process, the neural network 65 detects patterns within the content which the neural network 65 can then search for when accessing the content source 18 for new content. The neural network 65 can also continuously train based on whether the user U approves or disapproves of new identified content 66 found by the central server 12 each time the content sources 18 are searched. That is, if the user U agrees that the identified content 66 is relevant to a client C and/or second party $P_2$, then the neural network 65 can use that identified content 66 as a positive training example for searching for additional content. If the user U rejects the identified content 66 as being relevant to a client C and/or second party $P_2$, then the neural network 65 can use that identified content 66 as a negative training example for searching for additional content. In this way, the neural network 65 is continuously trained using examples of what type of content is desirable and undesirable. Using this training, the neural network 65 can build and continuously update an algorithm for finding relevant content. The numerical value assigned to content as discussed above, for example, can further be based on the algorithm continuously developed by the neural network 65.

The central server 12 can further create a suggested communication 68 using one or more of the highest ranked identified content 66. The central server 12 can create a suggested communication 68, for example, when a minimum threshold numerical value for the communication is met using Equations 1, 2 and/or 3 discussed above or similar derivative or alternative calculations (e.g., as developed by at least one neural network). In an embodiment, the central server 12 can process a plurality of relevant content 66 according to the Equations 1, 2 and/or 3 discussed above or similar derivative or alternative calculations, and can either rank a plurality of suggested communications 68 based on the resulting numerical value, or can automatically save only one or more of the highest ranking suggested communications 68 for review by the user U.

In an embodiment, the central server 12 can further compose the suggested communication 68 based on the type of identified content 66 being transmitted by the suggested communication 68. For example, the central server 12 can determine the identified content 66 to be primarily related to professional, personal, or legal data based on the keyword extraction algorithms 64 discussed above. The central server 12 can thereafter use this categorization to compose the suggested communication 68 accordingly. For example, if the identified content 66 is primarily related to professional keywords, the central server 12 can compose a formal communication. On the other hand, if the identified content 66 is primarily related to personal keywords, the central server 12 can compose a more informal communication. In this manner, the instant disclosure serves to identify curated content likely to be of particular interest to the contact C and/or second party $P_2$.

In an embodiment, the central server 12 can use prior communications written by the user U using the user terminal 14, and/or prior communications between the user U and the client C, to compose the suggested communication 68 to be sent to the client C. Here, the central memory 22 can include at least one neural network 67 which can be trained to compose suggested communications 68 which have been personalized a particular user U. The neural network 67 can be trained, for example, by using a plurality of prior communications between the user U and the client C to learn the user U's writing style (e.g., word choice, sentence or paragraph length, nonce words, etc.). Through the training process, the neural network 67 detects patterns within the user U's communications that can then be repeated when composing suggested communications. The neural network 67 can also continuously train based on whether the user U approves or disapproves of new suggested communications 68 each time a new suggested communication 68 is proposed. That is, if the user U agrees that the suggested communication 68 is acceptable to send to a client C and/or second party $P_2$, then the neural network 67 can use that suggested communication 68 as a positive training example for composing additional communications. If the user U rejects the suggested communication 68 for being unacceptable to send to a client C and/or second party $P_2$, then the neural network 67 can use that suggested communication 68 as a negative training example for composing additional communications. If the user U edits the suggested communication 68, then the neural network 67 can use the edited version as a positive training example for composing additional communications. In this way, the neural network 67 is continuously trained using examples communications approved or disapproved by the user U. Using this training, the neural network 67 can build and continuously update an algorithm for compositing suggested communication 68.

Once the central server 12 has created a suggested communication 68, the web interface 24 can cause the suggested communication 68 to be displayed on the GUI 25 of the user terminal 14 for a particular user U. The user U can then review the communication, and if acceptable, send the communication or approve of the communication being sent to the contact C. For example, the suggested communication 68 can be an automatically generated email, including a link to, or other form of, the identified content 66, that is presented to the user U on the GUI 25. Thereafter, the user U can send the suggested communication 68 as-is, modify the suggested communication 68 as desired, or even discard the suggested communication 68. The user U may wish to modify the suggested communication 68, for example, by adding a personal touch such as a link to an upcoming webinar by the user U which is related to the identified content 66. Alternatively, the central server 12 can automatically send the suggested communication 68 to the contact C without approval of the user U if certain thresholds have been met, for example, using Equations 1, 2 and/or 3 discussed above or similar derivative or alternative calculations. In this embodiment, the user U can be notified of the automatically sent communication 68 in any desirable manner, e.g., being cc'ed or bcc'ed on an email a notification on the GUI 25 or any other suitable manner.

As discussed above, the user U's approval, disapproval and/or editing of the identified content 66 and/or suggested communication 68 can be used to train at least one neural network 65 and/or at least one neural network 67. Here, if the user U specifies that the identified content 66 is unacceptable, then the web interface 24 can relay this information back to the neural network 65 for additional training. Likewise, if the user U identifies that the suggested communication 68 is unacceptable through rejection or editing, then the web interface 24 can relay this information back to the neural network 67 for additional training. If the user U approves of the identified content 66 and/or suggested communication 68, then the web interface 24 can relay this information back to the neural network 65 and/or neural network 67 as a positive example for additional training. In this way, the neural networks are continuously trained using examples which have been approved or disapproved by the user U. Additionally, the neural network 65 and/or neural network 67 can be trained based on the response to the communication by the contact C (e.g., whether the contact C responds to the communication, and/or the positive or negative tone of the contact C's response.

In an embodiment, certain identified content 66 can be relevant to multiple contacts $C_1, C_2 \ldots C_n$ employed by the same second party $P_2$. Here, the central server 12 can calculate numerical values for each of the multiple contacts $C_1, C_2 \ldots C_n$ to determine the best contact C to which the identified content is sent. The numerical values can be calculated, for example, according to the Equations 1, 2 and/or 3 discussed above or similar derivative or alternative calculations. In this embodiment, since the contacts $C_1, C_2 \ldots C_n$ can have similar professional data 62a and/or legal data 62c from having been employed by the same second party $P_2$, the personal data 62b for each of the multiple contacts $C_1, C_2 \ldots C_n$ can be the determining factor as to who the central server recommends receives the identified content. Alternatively, the identified content can be suggested to be sent to some or all of the contacts $C_1, C_2 \ldots C_n$ meeting a minimum threshold.

In an embodiment, the central server 12 can further identify a particular user U of a plurality of users $U_1, U_2 \ldots U_n$ of a first party $P_1$ is best suited to send identified content 66 to one or more contact $C_1, C_2 \ldots C_n$ of a second party. Here, the users U can also have their own professional, personal, and/or legal expertise saved within the database 26, which the central controller 20 can use to identify an optimal user U for sending the identified content.

The optimal user U can be determined by calculating a numerical value using equations similar to or derivative of the calculations discussed herein, or can be identified based on previous contacts or an existing relationship with a client C best suited to receive the identified content 66.

In an alternative embodiment, the central server 12 can create suggested communications 68 from time to time even when the previously discussed conditions are not met. For example, if the central server 12 has access to the GPS device 50, the digital calendar 52, and/or another terminal-specific device which tracks movements and/or data usage by the user U of the user terminal 14, the central server 12 can use this data to generate appropriately timed suggested communications 68 from the user U to the contact C. For example, if an upcoming meeting with the contact C is listed in the user U's digital calendar 52, or if the user U has recently met with the contact C according to the digital calendar 52, then the central server 12 can automatically generate a suggested communication 68 based on the most relevant content at the time, even if the most relevant does not meet the minimum thresholds to normally generate suggested communications 68. In another example, if the GPS device 52 shows the user U to be located in a location that is personally, professionally, or legally of interest to a contact C and/or a second party $P_2$, then the central server 12 can generate a suggested communication 68 at the time when the GPS device 68 indicates that the user U is present in that location. A location could be professionally of interest, for example, if that location contains a local office for the contact C and/or the second party $P_2$. A location could be personally of interest to a contact C, for example, if the contact C had previously mentioned in an email as traveling to that location. In such cases, the suggested communication 68 can be presented to the user 12 for approval as discussed above.

In an embodiment, the system 10 operates continuously or periodically to discover identified content 66 and generate suggested communications 68 without input from a user. Then, when a user U logs into the system 10 using a user terminal 14, the most relevant identified content 66 and/or suggested communication 68 is readily available without further processing needed. Alternative, the user U can initiate the discovery of identified content 66 and/or the generation of a suggested communication 68 by logging into the system 10 using a user terminal 14 and creating, editing, or viewing a particular profile 60 within the system 10.

Figure 5:
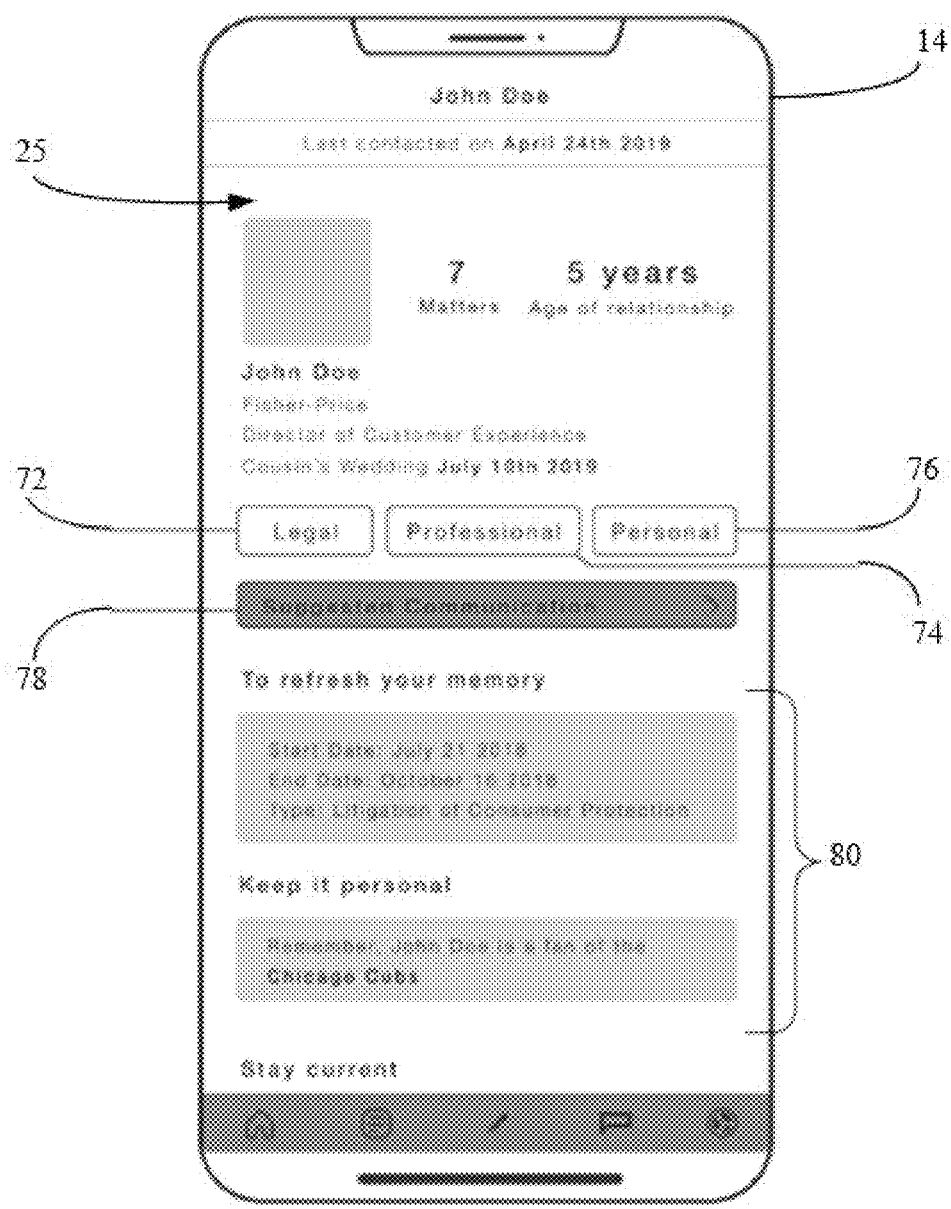
FIG. 5 illustrates an example embodiment of a graphical user interface which can be displayed on a user terminal using the system of FIG. 1.

FIG. 5 illustrates an exemplary GUI 25 for a particular contact C ("John Doe") which can be accessed by a user U using a user terminal 14. As shown, user-selectable buttons 72, 74, 76 are provided such that a user U can initiate prompts that facilitate the entry of legal data 62c, profession data 62a, and/or personal data 62b, respectively. Additionally, a suggested communication button 78 is provided that, when selected, causes the central server to either: (i) display a previously determined suggested communication for the user U; or (ii) initiate the methods discussed above by accessing content sources 18, finding relevant content 66 and/or generating the most optimal suggested communication 68 at the time. Further, the illustrated example includes summary data and communication style tips 80 that further aid the user U when sending a suggested communication 68. In an embodiment, the GUI 25 can further include links, for example, to one or more social media profile of the contact C, one or more social media profile of the second party $P_2$, the second party $P_2$'s official website, and/or outside new articles written about the contact C and/or second party $P_2$.

The embodiments described herein provide improved systems and methods for identifying relevant content and automatically generating contact correspondence based thereon. By condensing the data using the various methods and calculations discussed herein, processing speeds can be increased and memory space can be conserved. Particularly for large organizations managing hundreds of contacts, the systems and methods enable relevant and optimized content to be communicated to relevant contacts at optimal times, with processing speeds increased in comparison for searching for content, scheduling communication times, and personally generating communications. It should be understood that various changes and modifications to the systems and methods described herein will be apparent to those skilled in the art and can be made without diminishing the intended advantages.

GENERAL INTERPRETATION OF TERMS

In understanding the scope of the present invention, the term "comprising" and its derivatives, as used herein, are intended to be open ended terms that specify the presence of the stated features, elements, components, groups, and/or steps, but do not exclude the presence of other unstated features, elements, components, groups, integers and/or steps. The foregoing also applies to words having similar meanings such as the terms, "including", "having" and their derivatives. Also, the terms "part," "section," or "element" when used in the singular can have the dual meaning of a single part or a plurality of parts. Accordingly, these terms, as utilized to describe the present invention should be interpreted relative to a connecting device.

The term "configured" as used herein to describe a component, section or part of a device includes hardware and/or software that is constructed and/or programmed to carry out the desired function.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A system for generating correspondence with one or more contacts, the system comprising:
    a central server including at least a processor and a memory, the central server configured to communicate with a user terminal and a plurality of content sources;
    the user terminal configured to accept, from a user, at least one contact input regarding at least one contact;
    the plurality of content sources controlled by a plurality of third parties and including potential content of interest to the at least one contact; and
    the processor configured to execute instructions stored on the memory to cause the central server to: (i) determine at least one keyword relevant to the at least one contact based on the at least one contact input; (ii) use the at least one keyword to identify relevant content from the plurality of content sources; (iii) calculate at least one value for the relevant content, the calculating of the at least one value including multiplication of a value based on weighted keywords; and (iv) generate a suggested communication to be displayed for the user on the user terminal when the at least one value meets a threshold.

2. The system of claim 1, wherein the at least one contact input relates to the at least one contact's professional or personal information.

3. The system of claim 1, wherein determining the at least one keyword includes generation of a keyword algorithm using the at least one keyword, and wherein identifying the relevant content includes applying the keyword algorithm to the plurality of content sources.

4. A system for generating correspondence with one or more contacts, the system comprising:
    a central server including at least a processor and a memory, the central server configured to communicate with a user terminal and a plurality of content sources;
    the user terminal configured to accept, from a user, at least one contact input regarding at least one contact;
    the plurality of content sources controlled by a plurality of third parties and including potential content of interest to the at least one contact; and
    the processor configured to execute instructions stored on the memory to cause the central server to: (i) determine at least one keyword relevant to the at least one contact based on the at least one contact input; (ii) use the at least one keyword to identify relevant content from the plurality of content sources; (iii) calculate at least one value for the relevant content, the calculating the at least one value including summing a plurality of variables based on a relationship between the user and the at least one contact; and (iv) generate a suggested communication to be displayed for the user on the user terminal when the at least one value meets a threshold.

5. The system of claim 4, wherein calculating the at least one value includes performing a calculation using an input based on a time since last working engagement with the at least one contact.

6. The system of claim 4, wherein calculating the at least one value includes performing a calculation using an input based on an age of relationship between the user and the at least one contact.

7. The system of claim 4, wherein the user terminal includes a digital calendar, and wherein calculating the at least one value includes performing a calculation using an input based an amount of time since a communication between the user and the at least one contact as determined from the digital calendar.

8. The system of claim 4, wherein calculating the at least one value includes multiplication of a value based on weighted keywords.

9. A method of generating correspondence with one or more contact, the method comprising:
    determining at least one keyword relevant to at least one contact based on at least one interest of the at least one contact;

identifying relevant content from a plurality of content sources based on the at least one keyword;

calculating at least one value for the relevant content, the calculating the at least one value including multiplication of a value based on weighted keywords; and generating a suggested communication to be transmitted to the at least one contact when the at least one value meets a threshold.

10. The method of claim 9, wherein determining the at least one keyword includes generating a keyword algorithm using the at least one keyword, and wherein identifying the relevant content includes applying the keyword algorithm to the plurality of content sources.

11. The method of claim 9, wherein calculating the at least one value includes accessing a digital calendar and using an input based on the digital calendar.

12. The method of claim 9, wherein the weighted keywords are weighted based on one or more professional interests of the at least one contact.

13. The method of claim 9, wherein the weighted keywords are weighted based on one or more personal interests of the at least one contact.

14. The method of claim 9, wherein the weighted keywords include at least one keyword pertaining to a company of the at least one contact.

15. A method of generating correspondence with one or more contact, the method comprising:

determining at least one keyword relevant to at least one contact based on at least one interest of the at least one contact;

identifying relevant content from a plurality of content sources based on the at least one keyword;

calculating at least one value for the relevant content, the calculating the at least one value including summing a plurality of variables based on the relationship between the user and the at least one contact; and generating a suggested communication to be transmitted to the at least one contact when the at least one value meets a threshold.

16. The method of claim 15, wherein calculating the at least one value includes multiplication of a value based on weighted keywords.

17. A system for generating correspondence with one or more contacts, the system comprising:

a central server including at least a processor and a memory, the central server configured to communicate with a user terminal and a plurality of content sources;

the user terminal configured to accept, from a user, at least one contact input regarding at least one contact;

the plurality of content sources controlled by a plurality of third parties and including potential content of interest to the at least one contact; and the processor configured to execute instructions stored on the memory to cause the central server to: (i) determine at least one keyword relevant to the at least one contact based on the at least one contact input; (ii) use the at least one keyword to identify relevant content from the plurality of content sources; (iii) calculate at least one value for the relevant content, the calculating the at least one value including performing a calculation using an input based on a time since last working engagement with the at least one contact, the time since last working engagement being a variable which varies linearly with time until reaching a maximum value; and (iv) generate a suggested communication to be displayed for the user on the user terminal when the at least one value meets a threshold.

18. A system for generating correspondence with one or more contacts, the system comprising:

a central server including at least a processor and a memory, the central server configured to communicate with a user terminal and a plurality of content sources;

the user terminal configured to accept, from a user, at least one contact input regarding at least one contact;

the plurality of content sources controlled by a plurality of third parties and including potential content of interest to the at least one contact; and the processor configured to execute instructions stored on the memory to cause the central server to: (i) determine at least one keyword relevant to the at least one contact based on the at least one contact input; (ii) use the at least one keyword to identify relevant content from the plurality of content sources; (iii) calculate at least one value for the relevant content, the calculating the at least one value including performing a calculation using an input based on an age of relationship between the user and the at least one contact, the age of the relationship being a variable which varies sinusoidally over time once a minimum threshold has been reached; and (iv) generate a suggested communication to be displayed for the user on the user terminal when the at least one value meets a threshold.

19. A method of generating correspondence with one or more contact, the method comprising:

determining at least one keyword relevant to at least one contact based on at least one interest of the at least one contact;

identifying relevant content from a plurality of content sources based on the at least one keyword;

calculating at least one value for the relevant content, the calculating the at least one value including using an input based on a time since last working engagement with the at least one contact, the time since last working engagement calculated using a variable which varies linearly with time until reaching a maximum value; and generating a suggested communication to be transmitted to the at least one contact when the at least one value meets a threshold.

20. A method of generating correspondence with one or more contact, the method comprising:

determining at least one keyword relevant to at least one contact based on at least one interest of the at least one contact;

identifying relevant content from a plurality of content sources based on the at least one keyword;

calculating at least one value for the relevant content, the calculating the at least one value includes using an input based on an age of relationship between the user and the at least one contact, and the age of relationship calculated using a variable which varies sinusoidally over time once a minimum threshold has been reached; and generating a suggested communication to be transmitted to the at least one contact when the at least one value meets a threshold.

* * * * *